W. EVANS.
MANDREL.
APPLICATION FILED OCT. 18, 1907.

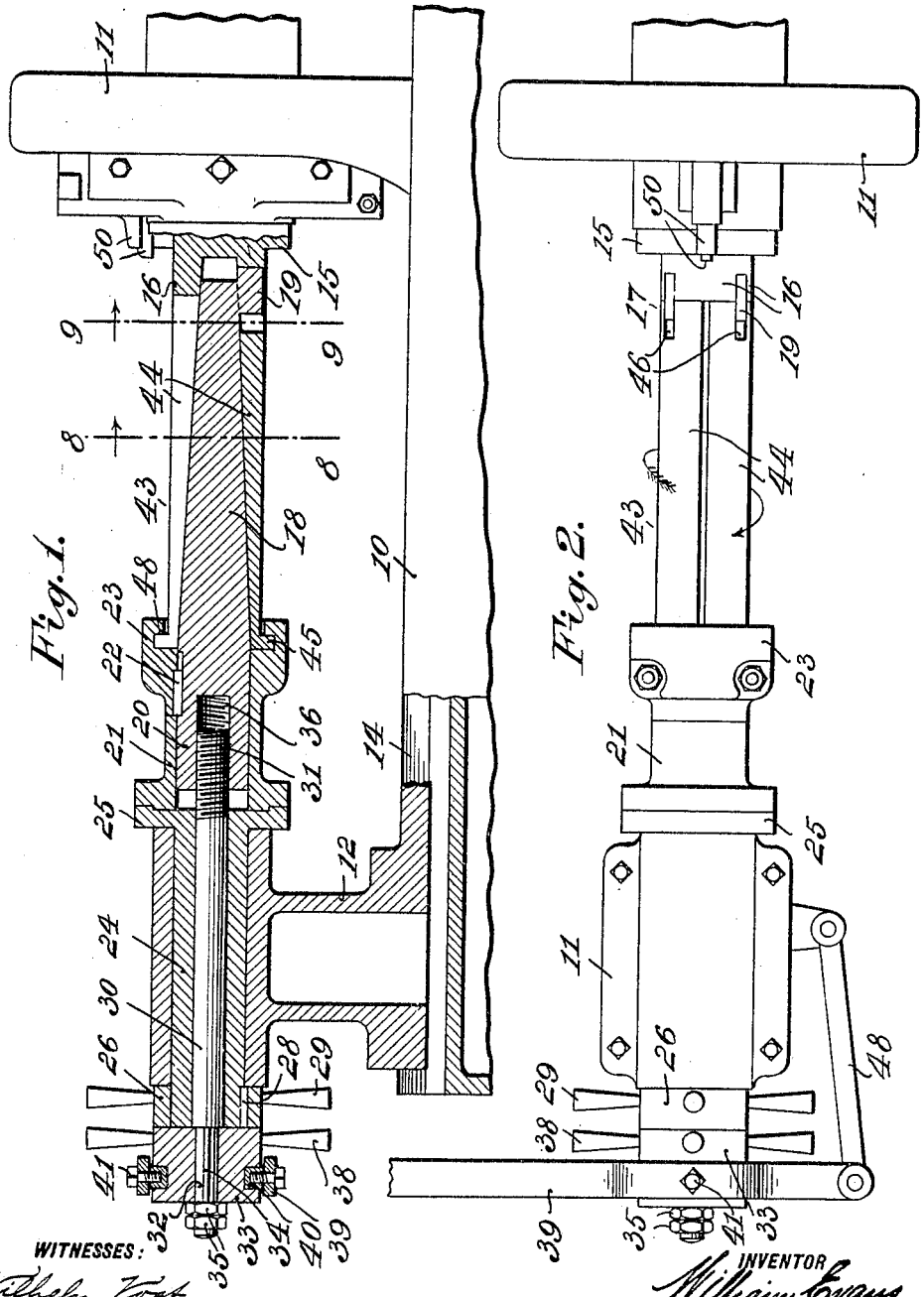
W. EVANS.
MANDREL.
APPLICATION FILED OCT. 18, 1907.
904,252.
Patented Nov. 17, 1908.
2 SHEETS—SHEET 1.

904,252.

Patented Nov. 17, 1908.
2 SHEETS—SHEET 2.

WITNESSES:
Wilhelm Vogt
Thomas M. Smith

INVENTOR
William Evans,
BY
J. Walter Douglas
ATTORNEY.

153. METAL BENDING.
Coiling.

UNITED STATES PATENT OFFICE.

WILLIAM EVANS, OF PHILADELPHIA, PENNSYLVANIA.

MANDREL.

No. 904,252.      Specification of Letters Patent.      Patented Nov. 17, 1908.

Application filed October 18, 1907. Serial No. 397,954.

*To all whom it may concern:*

Be it known that I, WILLIAM EVANS, a citizen of the United States, residing at the city of Philadelphia, in the county of Philadelphia and State of Pennsylvania, have invented certain new and useful Improvements in Mandrels, of which the following is a specification.

Figure 3:
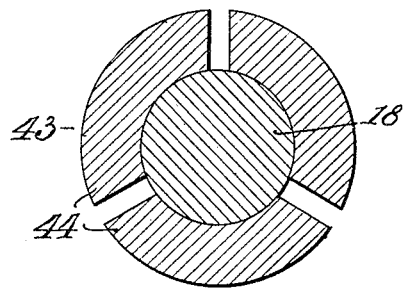
Figure 4:
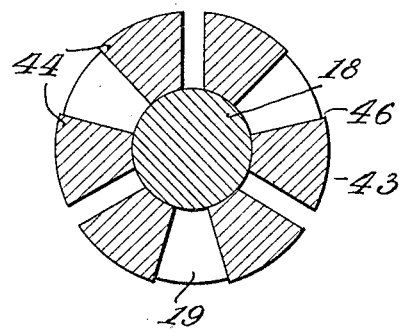
Figure 5:
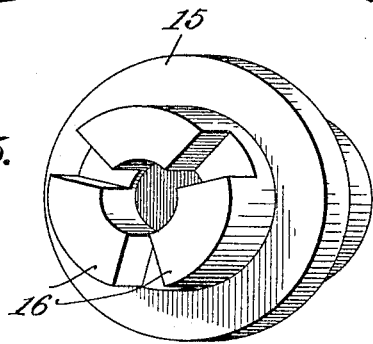
Figure 6:
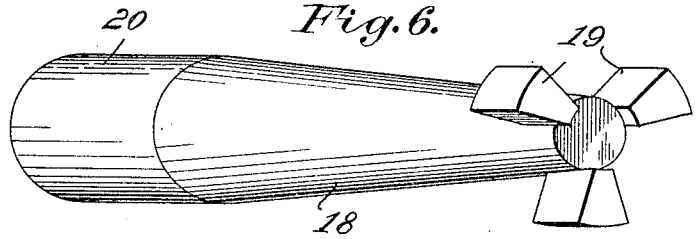
Figure 7:
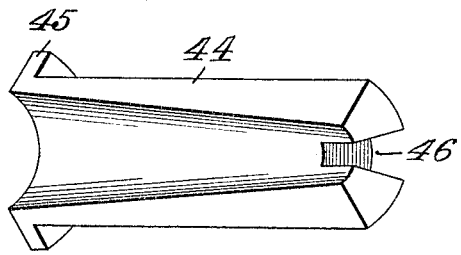

My invention has relation to a mandrel, and in such connection it relates more particularly to the constructive arrangement of parts thereof to permit of automatic collapse as well as automatic release of an article held by such mandrel.
The nature and scope of my invention will be more fully understood from the following description taken in connection with the accompanying drawings forming part hereof, in which Figure 1 is a view, partly in section and partly in side elevation, of a mandrel, and a portion of a machine for supporting the same. Fig. 2 is a top or plan view of Fig. 1. Figs. 3 and 4, are sectional views respectively on the lines 8—8 and 9—9 of Fig. 1; and Figs. 5, 6 and 7, are perspective views, illustrating respectively a head for driving and forming one member of a coupling for a tapering spindle or cone having projections forming the other coupling member thereof, and one member of a sectional sleeve having a slot for engaging a coupling member of the cone or tapering spindle.

Referring to the drawings, 10 represents a bed-plate provided with a fixed support 11, and a support 12 slidably arranged in a guide-groove 14 of the bed-plate 10, as shown in Fig. 1. In the support 11, is arranged a head 15, which is rotated by means, not shown, and is provided with projections 16, forming one member of a coupling 17, the other member of which is formed by projections 19 of a tapering spindle or cone 18, interlocking with the projections 16, which also support the spindle by engaging the contracted end thereof as will be readily understood from Figs. 1, 2 and 5. The spindle 18, with its cylindrical end portion 20, is slidably arranged in a head 21, and is prevented from turning therein by means of a key 22 engaging a removable cap 23, of the head 21, as shown in Fig. 1. The head 21 by means not shown is secured to a sleeve 24, mounted loosely on the slidable support 12, of the bed-plate 10, and is provided at one end with a flanged or outwardly extending portion 25, to which the head 21, is secured, and which engages the support 12, at one end, while a collar 26, removably secured to the sleeve 24, by a key 28, engages the support 12, from the opposite end. The sleeve 24, serves as a support for a bolt 30, the threaded end portion 31, of which engages a threaded socket 36, arranged in the expanded end 20, of the tapering spindle 18, as shown in Fig. 1.

At the free contracted end 32, the bolt 30, is provided with a collar 33, which is prevented from turning thereon, by means of a key 34, while nuts 35, prevent disengagement of the collar 33, from the contracted end 32, of the bolt 30. The collar 33, serves to turn the bolt 30, in the sleeve 24, and tapering spindle 18, which by the threaded portion 31 of the bolt is thus moved back and forth in the head 21, while a lever 39, provided with rollers 40, secured thereto by bolts 41, engaging the collar 33, permits of the sliding of the bolt 30, and thus of a quick movement of the spindle 18, in the head 21. This sliding movement of the spindle 18, imparted thereto by the rotation of the bolt 30, and by the sliding of the same in the sleeve 24, serves to permit of the slow or quick expansion or contraction of a sleeve 43, composed of tapering sections 44, the flange 45 of which engages a groove 48, arranged in the head 21 and the cap 23, while a groove 46, arranged therein permits of the engagement of the sections 44, with one of the projections 19 of the spindle 18, as shown in Figs. 1 and 2. The sections 44 at their contracted end are thus securely and movably connected with the head 21, and at their expanded end in a like manner with the spindle 18, and may be readily disengaged from the head 21, by removing the cap 23 therefrom. By this arrangement when the spindle 18, and the sleeve 43 surrounding the same is moved away from the driving head 15, by the sliding of the support 12, in the bed-plate 10, by means not shown, the sectional sleeve 43 is securely held in position on the spindle 18. When so disengaged a spring formed on the sleeve 43, may be removed therefrom, after which the same and the spindle 18, are again brought into engagement with the driving head 15, by the sliding of the support 12 towards the support 11.

In the proper engagement of the coupling members 16 and 19, of the driving head 15, and the spindle 18, with each other, the spindle is aided by the collar 26, which by its turning and thus by the turning of the sleeve 24 to which it is keyed, the driven head 21 and spindle 18, brings the projections 19 thereof, in the proper coupling position with respect to the projections 16, of the driving head 15. When a spring is to be formed the red hot wire or bar at one end is secured to dogs 50, of the support 11, in a manner not shown, after which the spindle 18, and by the same the sectional sleeve 43, driven-head 21 and supporting sleeve 24, is rotated in the support 12, in the direction of the arrow in Fig. 2. The rotation of the spindle 18 and support 21 tends to rotate the bolt 30 and its collar 33 in the same direction. The friction, however, between the support 24 and the bolt 30 and its collar is not sufficient to rotate the bolt and collar with the same speed as the support 24 and spindle 18 is driven, which is also partly due to the resistance offered by the rollers 40, and the weight of the lever 39, resting on the collar 33, to such rotation. Thus the thread 31 of the bolt 30 running in a direction opposite to that of the direction of rotation of the spindle 18 and support 24, will by engaging the threaded portion 36 of the spindle 18, draw the same slowly towards the driven sleeve 24, thus permitting a slight contraction or collapse of the sectional sleeve 43. This contraction of the sleeve 43 is in a certain proportion to the speed of rotation of the driving head 15, so that each winding of the spring is loosened from the sleeve 43, when completed. Thus the spring when completed, is also entirely loosened from the sleeve 43, after which the same may be still more and quickly contracted, by sliding the bolt 30, in the supporting sleeve 24, from right to left in Fig. 1, by manually actuating the lever 39 and by the same shifting the collar 33 and bolt 30. The lever 39, by means of a link 48, is movably secured to the sliding support 12, as shown in Fig. 2. The turning of the collars 26 and 33, is facilitated by handles 29 and 38, respectively, secured thereto.

Having thus described the nature and objects of my invention, what I claim as new and desire to secure by Letters Patent is:—

1. In a mandrel, a tapering spindle, a sectional sleeve mounted thereon, means for supporting the spindle, and means carried by the supporting means and arranged when the spindle is rotated to automatically draw the same into said supporting means to permit of gradual collapse of the sleeve.

2. In a mandrel, a tapering spindle, a sectional sleeve mounted thereon, means for supporting the spindle, and means carried by the supporting means and arranged when the spindle is rotated to be automatically actuated by the same through the intervention of the supporting means to permit of gradual collapse of the sleeve.

3. In a mandrel, a tapering spindle, a sectional sleeve mounted on the spindle, means for slidably supporting the spindle and arranged to be rotated by the same, and means connected with the spindle and carried by and frictionally engaging the supporting means, said supporting means when rotated adapted to impart rotary movement of less speed to the connecting means, and said connecting means when rotated adapted to automatically draw the spindle into the supporting means to permit of gradual collapse of the sleeve on said spindle.

4. In a mandrel, a tapering spindle, a sectional sleeve collapsibly mounted on the spindle, means for slidably supporting the spindle and arranged to be rotated by the same, a bolt having a threaded portion engaging the spindle and a collar frictionally engaging the supporting means, said bolt when rotated with less speed by friction between the same and the supporting means adapted to automatically permit of gradual collapse of the sleeve on said spindle by slowly drawing the same into said supporting means.

5. In a mandrel, a tapering spindle having projections forming one member of a coupling, a driving-head having projections interlocking with the projections of the spindle and forming the other member of the coupling, means for slidably supporting the spindle at the end opposite the driving head and arranged to be rotated by the spindle, a sectional sleeve, each section whereof is engaged at one end by the supporting means and engaging at the other end one of the projections of the spindle, a bolt having a threaded portion engaging the spindle and a collar frictionally engaging the supporting means.

6. In a mandrel, a fixed and a slidable support, a driving head rotatably carried by the fixed support and having projections forming one member of a coupling, a tapering spindle supported at one end by the projections of the driving head and having projections interlocking with the projections thereof and forming in conjunction therewith the coupling, a driven head slidably supporting the spindle at the other end, a supporting sleeve carrying the driven-head and rotatably mounted on the slidable support, a bolt having a threaded portion engaging the spindle and a collar frictionally engaging the supporting sleeve, a sectional sleeve, each section whereof is engaged by the driven head and engages one of the projections of the spindle, said spindle when rotated by the driving head adapted to rotate the driven-head and supporting sleeve to impart by the same to the bolt a rotary movement, and said bolt when rotated adapted to draw the spindle into said driven head to permit of gradual collapse of the sectional sleeve.

7. In a mandrel, a fixed and a slidable support, a driving head rotatably carried by the fixed support and having projections forming one member of a coupling, a tapering spindle supported at one end by the projections of the driving head and having projections interlocking with the projections thereof and forming in conjunction therewith the coupling, a driven head slidably supporting the spindle at the other end, a supporting sleeve carrying the driven-head and rotatably mounted on the slidable support, a bolt having a threaded portion engaging the spindle and a collar frictionally engaging the supporting sleeve, a sectional sleeve, each section whereof is engaged by the driven-head and engages one of the projections of the spindle, said spindle when rotated by the driving head adapted to rotate the driven-head and supporting sleeve to impart by the same to the bolt a rotary movement, said bolt when rotated adapted to draw the spindle into said driven head to permit of gradual collapse of the sectional sleeve, said slidable support when actuated adapted to permit of the disengagement of the spindle from the driving-head, and a lever engaging the collar of the bolt and adapted when actuated to permit of quick movement of the spindle in the driven-head and quick collapse of the sectional sleeve.

8. In a mandrel, a tapering spindle, a sectional sleeve mounted thereon, means for supporting the spindle and arranged to be rotated by the same, a bolt carried by the supporting means and engaging with the respective ends said spindle and said means, said bolt arranged when rotated by the supporting means to automatically draw the spindle into the same to permit of gradual collapse of the sectional sleeve, and means engaging the bolt and arranged when actuated to permit by the same of manual actuation of the spindle to permit of quick collapse of the sleeve thereon.

In witness whereof, I have hereunto set my signature in the presence of two subscribing witnesses.

WILLIAM EVANS.

Witnesses:
    THOMAS M. SMITH,
    WILHELM VOGT.